Figure 1:
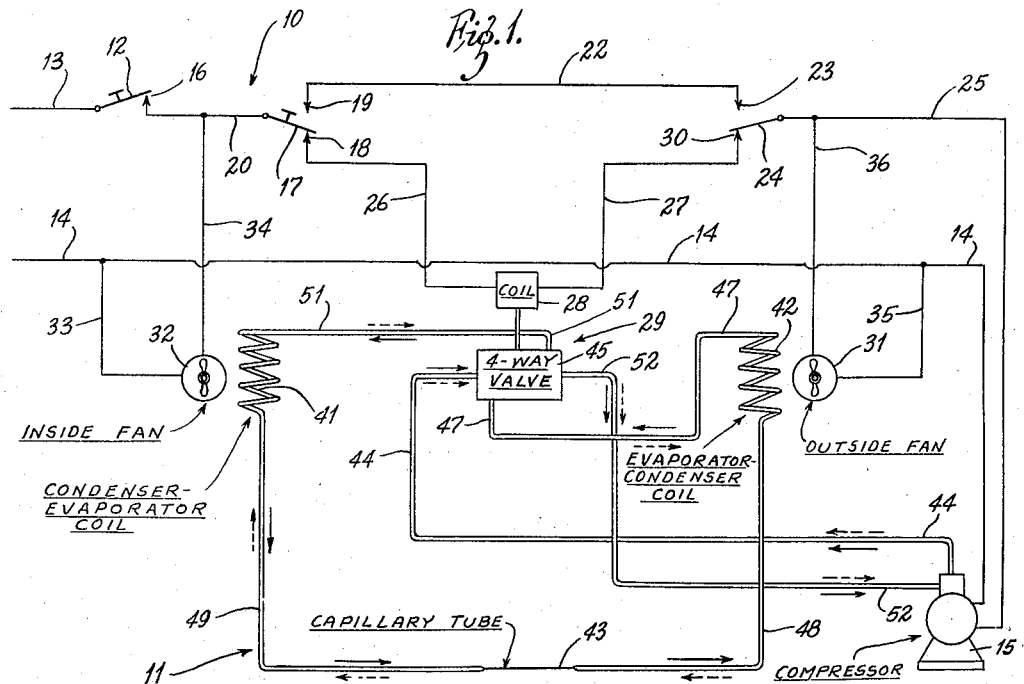

Aug. 25, 1959     R. B. TILNEY     2,900,805
ELECTRIC CONTROL CIRCUITS FOR HEAT PUMPS

Filed Aug. 2, 1956

INVENTOR:
RALPH B. TILNEY,
BY Kingsland, Rogers & Ezell
ATTORNEYS

United States Patent Office 2,900,805
Patented Aug. 25, 1959

2,900,805

ELECTRIC CONTROL CIRCUITS FOR HEAT PUMPS

Ralph B. Tilney, Clayton, Mo., assignor to Alco Valve Company, St. Louis, Mo., a corporation of Missouri Application August 2, 1956, Serial No. 601,759

7 Claims. (Cl. 62—160)

This invention relates to improvements in electric circuits for control of heat pump systems, and in particular is concerned with an electric circuit which can be made either semi-automatic or fully automatic.

The electric circuit of this invention is particularly well adapted to be used in a heat pump system of a reversible nature which can be employed for heating or cooling through the use of a directly operated four way valve. By the electric circuit provided, a series arrangement of the solenoid employed for operating the four way valve can be used which takes less power in the stalled conditions of the valve than where a shunt arrangement is utilized. This is of advantage since the solenoid in series in the stalled condition is not subject to burning out while a shunt arrangement, through the large current and power drain of such a circuit, is subject to burning out unless specially designed.

Through the circuit used in this invention, the solenoid operated valve may be employed for reversible heating and cooling in four different conditions of operation of the electric circuit and in which, in only one of these conditions, the solenoid need be energized. This is quite advantageous in minimization of power and in reducing to a minimum the required service upon the solenoid, and this circuit therefore greatly lengthens its life. For the circuit shown and the particular arrangement described, the four conditions of operation are an on and off position for the heating cycle, in which the solenoid is operated only in the on position, together with the operation of the compressor and the associated fans. For the cooling position, there are two conditions of on and off operation, neither of which requires the energization of the solenoid and in which the compressor and fans are employed only in the on position.

The operation of the circuit in this invention is controlled by thermostat switches in combination with a manual switch for the semi-automatic circuit and for a thermostatic switch arrangement only, in the fully automatic circuit. These circuit arrangements make possible a simple and efficiently operating circuit for controlling the heat pump in a very efficacious manner in which there are no complicated controls requiring critical and expensive maintenance.

Accordingly, it is a primary object of this invention to provide an electric circuit for heat pump control and for the direct operation of a solenoid valve which is simple and efficacious in arrangement.

A further object of this invention is to provide an electric control for a heat pump circuit in which a solenoid valve is used in a series arrangement.

Still another object of this invention is to provide an electric circuit for control of a heat pump system which may be changed to heating or cooling conditions through the use of thermostatic switches and in which a compressor may be cycled in the heat pump system depending upon whether the circuit is in on or off operation.

Yet a further object of this invention is to provide an electric circuit for a heat pump system in which a solenoid valve is arranged in series in the circuit to minimize power loss when the valve is in the stalled condition.

Still another object of this invention is to provide an electric circuit for heat pump systems which may be semi-automatic or fully automatic and in which a solenoid valve for the control of the heat pump system is arranged in series in the electric circuit.

Still another object of this invention is to provide an electric circuit for control of a heat pump system which is simple and rugged and requires no complicated components.

Further objects of this invention will appear in the detailed description which follows and will be further apparent to those skilled in the art.

Figure 2:
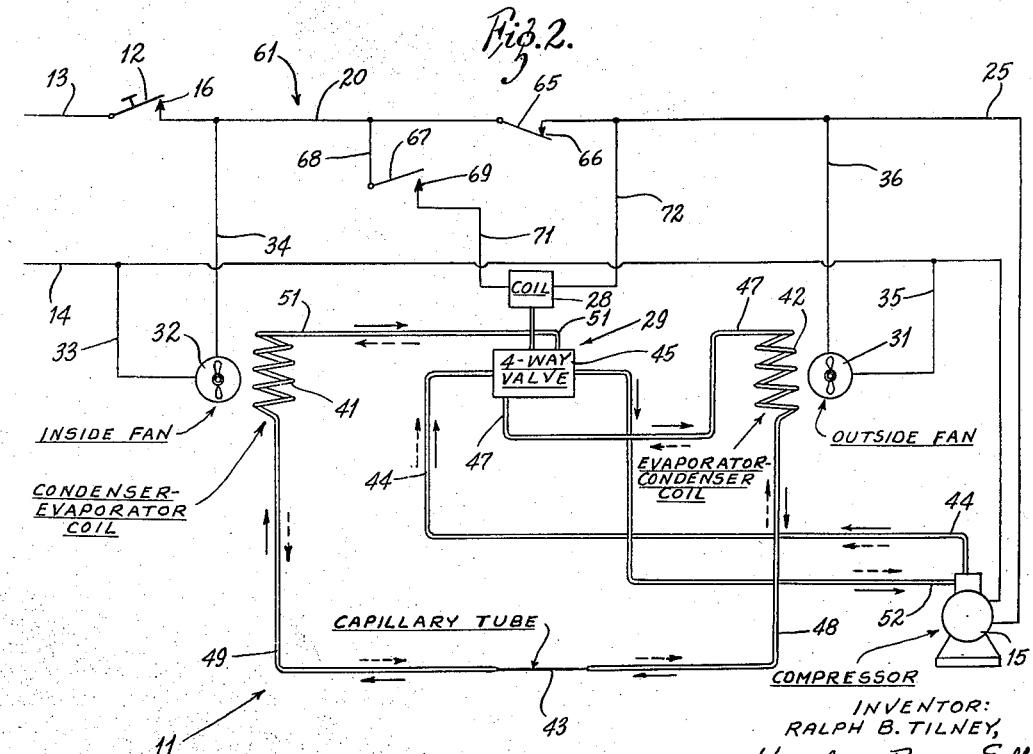

For the purpose of illustration of this invention, two embodiments of the electric circuit are shown which provide for semi-automatic or fully automatic control of heat pump systems. In the circuit, the inside fan is shown continuously operating, as inside a room, but it is to be understood that it may be readily cycled with the compressor as in the case of the outside fan. Further, this arrangement may be reversed as may also the disposition of the solenoid valve which is shown as being in the heating circuit so that it is energized only in the on position for heating. Thus, the solenoid may be put in the cooling circuit as will be well understood by those skilled in the art. Thus, it is to be understood that these drawings are for the purpose of illustration only and that the invention is not limited thereto. In the drawings:

Figure 1 is a schematic diagram showing a semi-automatic electric circuit in which the inside heat exchanger is shown operating in the heating condition; and Figure 2 is a schematic diagram of an electric circuit for fully automatic control of a heat pump system in which the inside heat exchanger is shown operating in the cooling condition.

The semi-automatic control circuit of Figure 1 is comprised of an electric circuit generally indicated by the numeral 10 and a heat pump system indicated by the numeral 11. In the electric circuit, a manually operated master switch 12 is connected to an electrical inlet line 13 while another power line 14 is connected to the compressor 15. The contact 16 of the manually operated master switch 12 is connected to a manual control switch 17 for the selection of the heating or cooling position of the circuit. The manually operated switch 17 is movable between a heating contact 18 and a cooling contact 19.

The cooling circuit is established through a lead 22 passing from the cooling contact 19 to a thermostatic switch cooling contact 23 in a thermostat switch 24 which completes the cooling circuit to a lead 25 to the compressor 15.

The heating circuit is established through the heating contact 18 and leads 26 and 27 connected to the coil 28 of a solenoid valve 29. The lead 27 is in communication with a heating contact 30 associated with a thermostat switch 24.

The heat pump system includes an inside fan 32 and an outside fan 31. The inside fan 32 is connected in parallel with the compressor 15, but is shown in a continuously running system once the master switch is closed. This is because it is connected to the power line 14 by lead 33 and to a lead 34 connected to the power lead 20 leading between the master switch contact 16 and the manual heating and cooling control switch 17. The outside fan is adapted to be cycled similarly to the compressor 15 since it is connected to the power line 14 and power lead 25 by leads 35 and 36, respectively.

The heat pump system 11 includes as its main components the four way solenoid valve 29, the compressor 15, the inside fan 32, a condenser-evaporator coil 41, the outside fan 31, an evaporator-condenser coil 42 and a capillary tube 43. In this system, a refrigerant line 44 is connected from the pressure side of the compressor 15 to the four way valve portion 45 of the solenoid valve. From the valve a line 47 leads to the top of the evaporator-condenser 42 while the bottom side of the evaporator-condenser coil is connected to the capillary tube by a line 48. The other side of the capillary tube is connected to the bottom of the condenser-evaporator 41 by a lead 49, and communication from the top of the coil 41 with the valve 45 is then established through a fluid refrigerant line 51. The suction side of the compressor 15 is connected to the valve 45 by lead 52 to complete the fluid line system.

The fully automatic electrical control circuit of Figure 2 includes the electric circuit generally indicated at 61 and the heat pump system generally indicated by the numeral 11 which is identical with that shown for Figure 1. Similar reference numerals will be used throughout for the identical components for this system. In the electric circuit 61, a power line 13 and manually operated master switch 12 having a switch contact 16, are employed as is also the power line 14 leading to the compressor 15. Similarly, the compressor 15 is connected to a lead 25 while the outside fan 31 is connected in parallel with the compressor by leads 35 and 36 so as to cycle with it. The inside fan 32 is connected to leads 14 and 20 by lines 33 and 34, respectively.

For this circuit, however, the manual switch has been eliminated and two thermostatic switches are employed. Thus, a cooling thermostat switch 65 is connected to the lead 20 and is adapted to complete a circuit to the compressor through cooling contact 66 connected to the lead 25. Similarly, a heating thermostat 67 is provided which is connected in parallel to the thermostat 65 through the lead 20 by a lead 68. This thermostat is associated with a heating contact 69 to complete a circuit through the coil 28 by leads 71 and 72, the latter of which is terminated at the lead 25.

Operation

In the semi-automatic electric circuit of Figure 1, the solenoid valve 29 is shown energized for the heating condition. In this arrangement, the inside fan will blow on the condenser-evaporator coil 41 which in this condition functions as a condenser and gives off heat to supply heat to the inside of the room, wherever the heat pump system is employed. The circuit is first controlled by the closing of the master switch 12. Subsequently, to put the circuit in the heating operation, the manual heating-cooling switch 17 is closed into contact with the heating contact 18.

After this manual operation has been effected, the automatic heating is accomplished through the operation of the thermostat 24. This thermostat may be conveniently set to close against the heating contact 30 when the temperature is 70° F. or below, for example. At temperatures of 73° and above, it may then open the contact. As shown, the thermostat switch 24 is closed against the heating contact and in the control circuit, a complete circuit has been made. Thus, current will flow in series from the inlet line 13 through the coil 28 to the compressor and thence through the line 14. Since the inside fan 32 and the outside fan 31 are arranged in parallel in the circuit, they will also operate with the inside fan, of course, operating continuously since it is not controlled by the manual switch 17 or the thermostat switch 24. For the circuit in the heating position, as above described, and with all components in the heat pump system operated, the compressor 15 will furnish high pressure refrigerant fluid to the four way valve 45 through the line 44. From the valve, high pressure fluid will then pass, as indicated in the full-bodied arrows, through conduit 51 to the condenser 41 and from thence through line 49 through the capillary tube 43. Low pressure fluid will then pass through the line 48 into the evaporator 42 and through the line 47 back to the valve 45 and then through the suction line 52 to the compressor to complete the cycle. In this condition, the condenser with the fan 32 blowing on it will provide hot air to a space to be heated.

After the space has been heated to the desired temperature, the thermostat switch 24, which will be conveniently located in the space in which the temperature is to be controlled, will open its contact 30 when the temperature is brought up to the off limiting value of 73° F. When this occurs, the circuit will be broken to the coil 28 and the compressor and outside fan 31. The inside fan 32 will continue to operate to provide for air circulation and ventilation. This completes the second condition providing for two conditions when the switch 17 is in the heating position against the contact 18 for on and off operation.

The cooling condition is established by moving the switch 17 to a closed position against the cooling contact 19. Where the temperature is below 73°, the thermostat switch 24 will remain out of contact with the cooling contact 23 and the operation will be identical with that described for the heating condition in the off position of the thermostat switch. When, however, the temperature rises above 73°, the thermostat switch will be closed against the contact 23 and a circuit will be established to energize the outside fan 31 and the compressor 15. In this condition, it will be noted, however, that the solenoid 29 is not operated since the coil 28 has no electrical path. The four way valve provides for reversal of flow when the coil is de-energized so that no drain of current or loss of power is required for the cooling operation which is the major load for the apparatus.

In the circuit established for the cooling operation, when the thermostat switch 24 is closed against the cooling contact 23, the heat pump system will, as for the heating condition, furnish high pressure refrigerant fluid from the compressor 15 through the line 44 to the four way valve 45. However, the functions of the coils 41 and 42 are reversed and in the cooling condition, the coil 41 acts as an evaporator and the coil 42 acts as a condenser. Thus, high pressure refrigerant fluid will, as indicated by the broken arrows, leave the valve 45 through the conduit 47 and from there pass through the condenser 42 and conduit 48 through capillary tube 43 and through the conduit 49 through the coil 41 now acting as an evaporator and then back to the four way valve through the conduit 51. The full pressure refrigerant fluid then returns to the suction side of the compressor through the conduit 52 to complete this cycle. After the temperature has been reduced below 70° F., the thermostat switch will be opened from the contact 23 and the compressor will be cycled and, of course, the electrical path will be interrupted, with the inside fan continuing to run for air circulation or ventilation.

The electric circuit 61 of the fully automatic system of Figure 2 is shown in the cooling condition. This circuit may be set to operate upon temperature values as in the semi-automatic circuit of Figure 1 or different values may be employed. For the purpose of example, the cooling thermostat switch 65 may be set to close against the cooling contact 66 when the temperature rises to 78° and open when the temperature drops to 75° while the heating thermostat switch 67 may be set to close against the heating contact 69 on cooling to 70° F. and open on warming to 73° F.

As shown in Figure 2, the thermostat switch 65 for the cooling condition has closed so that temperature will be somewhat above 75° and a complete electrical circuit is established to furnish current to the compressor 15 and the outside fan 31. The cooling circuit, as in the system for Figure 1, operates on deenergization of the solenoid valve 29 so that the reversed flow is established in the direction of the full-bodied arrows and exactly like the refrigerant flow for the cooling condition of the semi-automatic circuit and heat pump system above-described. Thus, coil 41 acts as an evaporator and the fan 32 blowing on it will furnish cool air to this space to be controlled. Likewise, the coil 42 acts as a condenser in this operational condition.

When the temperature falls below 75°, the thermostat 65 is opened from the contact 66 and the electrical path to the outside fan and fan 31 and the compressor 15 is interrupted. This establishes the second condition and no current drain is made.

When the temperature falls below 70° F., the thermostat switch 67 will close against the heating contact 69 to establish a series flow through the coil 28 of the solenoid valve and to furnish current to the outside fan 31 and the compressor 15. In this circuit, the energization of the solenoid valve reverses the flow to that shown for the broken arrows in Figure 2. Thus, for this heating condition, the coil 41 acts as a condenser and the fan 32 blowing against it furnishes hot air to the space to be controlled. Similarly, the coil 42 will be reversed in this operation and will act as an evaporator, and this flow is exactly the same as above-described for the heating cycle for the heat pump system 11 in Figure 1.

When the temperature rises above 73° F., the thermostat switch 67 will open from the contact 69 and the electrical path through the coil 28 and the outside fan 31 and the compressor 15 will be interrupted. This circuit provides for full automatic electric control of the heat pump and requires no manual operation.

Various changes and modifications may be made such as relocating the refrigerant conduits to and from the solenoid valve. Thus, where the major use of the heat pump system is for heating, it might be desirable to save power consumption and have the system operate for cooling when the four way valve is energized. Also, it may be desirable to use the inside fan in the same parallel circuit as the compressor to be controlled by the operation of the semi-automatic and automatic switches as for the outside fan to dispense with continual operation for air circulation or ventilation of the fan 32. Such changes and modifications will be obvious to those skilled in the art, and are within the scope of this invention as defined by the claims appended hereto.

What is claimed is:

1. An electric circuit for controlling a reversible heat pump system having a solenoid operated reversing valve, a pair of reversible heat exchanging fluid coils, a fluid restricting means and a compressor, said circuit comprising means for energizing the compressor and the solenoid in series, when the heat pump fluid flow is in one direction responsive to a selected temperature level and energizing the compressor only when the heat pump fluid flow is reversed responsive to a change in temperature to a different selected level, said means being incapable of energizing the solenoid only.

2. An electric circuit for controlling a reversible heat pump system having a solenoid operated reversing valve, a pair of reversible heat exchanging fluid coils, a fluid restricting means, a pair of fans separately connected in parallel, said fans being associated separately with the coils, and a compressor, said circuit comprising means for energizing the compressor and the solenoid in series, and the pair of fans in parallel when the heat pump fluid flow is in one direction responsive to a selected temperature level and energizing the compressor and the fans only when the heat pump fluid flow is reversed responsive to a change in temperature to a different selected level.

3. An electric circuit for controlling a reversible heat pump system having a solenoid operated reversing valve, a pair of reversible heat exchanging fluid coils, a fluid restricting means, a pair of fans separately connected in parallel, said fans being associated separately with the coils, and a compressor, said circuit comprising means for energizing the compressor and the solenoid in series, and the pair of fans in parallel when the heat pump fluid flow is in one direction responsive to a selected temperature level and energizing the compressor and the fans only when the heat pump fluid flow is reversed responsive to a change in temperature to a different selected level, and means for automatically controlling the energization of said compressor and at least one of said fans in response to the temperature of a space to be temperature regulated by said heat pump system.

4. An electric circuit for controlling a reversible heat pump system having a solenoid operated reversing valve, a pair of reversible heat exchanging fluid coils, a fluid restricting means and a compressor, said circuit including switching means for energizing and de-energizing the solenoid and thereby reversing the flow in said heat pump system and means for energizing and de-energizing said compressor, said last named means being incapable of energizing the solenoid only and including means in series with the solenoid for energizing the compressor when the solenoid is energized and separate means for energizing the compressor when the solenoid is de-energized.

5. An electric circuit for controlling a reversible heat pump system having a solenoid operated reversing valve, a pair of reversible heat exchanging fluid coils, a fluid restricting means and a compressor, said circuit including switching means for energizing and de-energizing the solenoid and thereby reversing the flow in said heat pump system, and means for energizing and de-energizing said compressor, said last named means including means in series with the solenoid for energizing the compressor when the solenoid is energized, and separate means for energizing the compressor when the solenoid is de-energized, and a pair of fans associated with the coils, one of said fans being disposed in an enclosed space and energized independently of said switching means for providing air circulation to said space and the other fan being connected in parallel with said compressor and simultaneously energized and de-energized therewith.

6. An electric circuit for controlling a reversible heat pump system having a solenoid operated reversing valve, a pair of reversible heat exchanging fluid coils, a fluid restricting means and a compressor, said circuit including manual switching means for energizing and de-energizing the solenoid and thereby reversing the flow in said heat pump system, and means for energizing and de-energizing said compressor, said last named means including means in series with the solenoid for energizing the compressor when the solenoid is energized and separate means for energizing the compressor when the solenoid is de-energized, said means for energizing and de-energizing the compressor including a thermostat device in series switching relationship with the compressor and being responsive to the temperature of a space to be temperature regulated by said heat pump system.

7. An electric circuit for controlling a reversible heat pump system having a solenoid operated reversing valve, a pair of reversible heat exchanging fluid coils, a fluid restricting means and a compressor, said circuit including automatic switching means for energizing and de-energizing the solenoid and thereby reversing the flow in said heat pump system, and means for energizing and de-energizing said compressor, said last named means including means in series with the solenoid for energizing the compressor when the solenoid is energized, and separate means for energizing the compressor when the solenoid is de-energized, both of said automatic switching means and said means for energizing and de-energizing the compressor including thermostat devices adapted to be connected in series with the compressor and being responsive to the temperature of a space to be temperature regulated by said heat pump system.

References Cited in the file of this patent

UNITED STATES PATENTS

| 2,077,296 | Wilkes | Apr. 13, 1937 |
| 2,713,250 | Blatchford | July 19, 1955 |
| 2,723,083 | Bary | Nov. 8, 1955 |
| 2,771,748 | Prosek | Nov. 27, 1956 |